United States Patent
Traßl et al.

(10) Patent No.: US 12,496,753 B2
(45) Date of Patent: Dec. 16, 2025

(54) PRODUCTION OF HIGH TEMPERATURE POLYMER BASED PELLETS BY UNDERWATER PELLETIZATION AT ELEVATED WATER TEMPERATURE TO PRODUCE (RIGID) BEAD FOAMS

(71) Applicant: Evonik Operations GmbH, Essen (DE)

(72) Inventors: Christian Traßl, Warmensteinach (DE); Melanie Niepert, Frankfurt (DE); Florian Hopf, Neu Isenburg (DE); Denis Holleyn, Hofheim am Taunus (DE); Mona Ganglauf, Hoechst (DE)

(73) Assignee: Evonik Operations GmbH, Essen (DE)

( * ) Notice: Subject to any disclaimer, the term of this patent is extended or adjusted under 35 U.S.C. 154(b) by 296 days.

(21) Appl. No.: 18/041,771

(22) PCT Filed: Jul. 15, 2021

(86) PCT No.: PCT/EP2021/069689
§ 371 (c)(1),
(2) Date: Feb. 15, 2023

(87) PCT Pub. No.: WO2022/037857
PCT Pub. Date: Feb. 24, 2022

(65) Prior Publication Data
US 2023/0311365 A1    Oct. 5, 2023

(30) Foreign Application Priority Data
Aug. 18, 2020 (EP) .................................... 20191446

(51) Int. Cl.
| B29C 44/34 | (2006.01) |
| B29B 9/06 | (2006.01) |
| B29B 9/16 | (2006.01) |
| B29K 79/00 | (2006.01) |
| B29K 81/00 | (2006.01) |
| C08J 9/16 | (2006.01) |
| C08J 9/18 | (2006.01) |

(52) U.S. Cl.
CPC .......... *B29C 44/3461* (2013.01); *B29B 9/065* (2013.01); *B29B 9/16* (2013.01); *C08J 9/16* (2013.01); *C08J 9/18* (2013.01); *B29K 2079/085* (2013.01); *B29K 2081/06* (2013.01); *C08J 2379/08* (2013.01); *C08J 2381/06* (2013.01)

(58) Field of Classification Search
CPC .... B29B 9/065; B29B 9/16; C08J 9/16; C08J 9/18; B29C 44/3461; B29K 2079/085; B29K 2081/04; B29K 2081/06
See application file for complete search history.

(56) References Cited

U.S. PATENT DOCUMENTS

| 5,612,417 | A | 3/1997 | Rhein et al. |
| 6,218,467 | B1 | 4/2001 | Wicker et al. |
| 7,371,795 | B2 | 5/2008 | Wicker et al. |
| 8,268,902 | B2 * | 9/2012 | Casalini .................. C08J 9/0066 524/1 |
| 10,343,314 | B2 | 7/2019 | Bernhard et al. |
| 10,919,198 | B2 | 2/2021 | Kraatz et al. |
| 11,117,294 | B2 | 9/2021 | Holmes et al. |
| 11,485,832 | B2 | 11/2022 | Traßl et al. |
| 11,499,028 | B2 | 11/2022 | Queiroz Da Fonseca et al. |
| 2007/0112082 | A1 | 5/2007 | Hahn et al. |
| 2007/0112135 | A1 | 5/2007 | Wicker et al. |
| 2012/0256341 | A1 * | 10/2012 | Gloeckner .............. B29B 7/826 425/86 |
| 2012/0309928 | A1 * | 12/2012 | Deiss ........................ B29B 9/16 528/308.2 |
| 2016/0332344 | A1 | 11/2016 | Bernhard et al. |
| 2017/0087750 | A1 | 3/2017 | Bernhard et al. |
| 2017/0253710 | A1 * | 9/2017 | Smith ....................... B29B 9/10 |
| 2018/0311869 | A1 | 11/2018 | Kraatz et al. |
| 2018/0333693 | A1 * | 11/2018 | Mueller ..................... B01J 2/20 |
| 2020/0032023 | A1 * | 1/2020 | Nakamoto ............... C08J 9/232 |
| 2020/0148851 | A1 * | 5/2020 | Queiroz Da Fonseca .................. B29B 7/88 |
| 2020/0207939 | A1 | 7/2020 | Traßl et al. |
| 2020/0325298 | A1 | 10/2020 | Traßl et al. |
| 2020/0407558 | A1 | 12/2020 | Traßl et al. |
| 2021/0095092 | A1 | 4/2021 | Traßl et al. |
| 2022/0063153 | A1 | 3/2022 | Richter et al. |
| 2022/0126490 | A1 | 4/2022 | Richter et al. |
| 2022/0127424 | A1 | 4/2022 | Gramlich et al. |

FOREIGN PATENT DOCUMENTS

| DE | 44 40 219 | 5/1996 |
| DE | 44 43 557 | 6/1996 |
| DE | 196 52 758 | 6/1998 |

(Continued)

OTHER PUBLICATIONS

Traßl et al., U.S. Appl. No. 18/255,409, filed Jun. 1, 2023.
U.S. Appl. No. 18/255,409, filed Jun. 1, 2023, Traßl et al.
International Search Report dated Oct. 15, 2021, in PCT/EP2021/069689, including English translation, 12 pages.
Written Opinion dated Oct. 15, 2021, in PCT/EP2021/069689, including English translation, 13 pages.
U.S. Appl. No. 16/640,626, filed Feb. 20, 2020, 2020/0207939, Traßl et al.

(Continued)

*Primary Examiner* — Jerzi H Moreno Hernandez
(74) *Attorney, Agent, or Firm* — Grüneberg and Myers PLLC

(57) ABSTRACT

A process can be used for producing (rigid) particle foams from polymer compositions containing at least one polymer having a glass transition temperature according to ISO 11357-2 of at least 180° C. with an underwater pelletization system.

11 Claims, No Drawings

(56) References Cited

FOREIGN PATENT DOCUMENTS

| | | |
|---|---|---|
| DE | 103 49 142 | 5/2005 |
| DE | 10 2013 225 132 | 6/2015 |
| DE | 10 2014 209 425 | 11/2015 |
| DE | 10 2014 216 992 | 3/2016 |
| EP | 0 716 122 | 6/1996 |
| EP | 2 565 224 | 3/2013 |
| EP | 2 361 174 B1 | 11/2014 |
| EP | 3 159 129 | 4/2017 |
| EP | 3 225 654 | 10/2017 |
| EP | 3 377 288 B1 | 4/2020 |
| EP | 3 889 212 | 10/2021 |
| WO | 98/27157 | 6/1998 |
| WO | 2005/047392 | 5/2005 |
| WO | 2005/056653 | 6/2005 |
| WO | 2011/134996 | 11/2011 |
| WO | 2015/082509 | 6/2015 |
| WO | 2015/177013 | 11/2015 |
| WO | 2017/067867 | 4/2017 |
| WO | 2017/167197 | 10/2017 |
| WO | 2017/167650 | 10/2017 |
| WO | 2019/025245 | 2/2019 |
| WO | 2019/038213 | 2/2019 |
| WO | 2019/062731 | 4/2019 |
| WO | 2019/101667 | 5/2019 |
| WO | 2019/101703 | 5/2019 |
| WO | 2019/101704 | 5/2019 |
| WO | 2020/148066 | 7/2020 |
| WO | 2020/148067 | 7/2020 |
| WO | 2020/161012 | 8/2020 |
| WO | 2021/197660 | 10/2021 |
| WO | 2022/002628 | 1/2022 |
| WO | 2022/037857 | 2/2022 |
| WO | 2022/117331 | 6/2022 |

OTHER PUBLICATIONS

U.S. Appl. No. 18/063,075, filed Dec. 7, 2022, Traßl et al.
U.S. Appl. No. 16/767,240, filed May 27, 2020, 2020/0407558, Traßl et al.
U.S. Appl. No. 15/733,134, filed May 26, 2020, 2021/0095092, Traßl et al.
U.S. Appl. No. 17/310,059, filed Jul. 14, 2021, 2022/0063153, Richter et al.
U.S. Appl. No. 17/423,152, filed Jul. 15, 2021, 2022/0126490, Richter et al.
U.S. Appl. No. 17/995,030, filed Sep. 29, 2022, Wursche et al.
U.S. Appl. No. 18/003,666, filed Dec. 28, 2022, Traßl et al.
U.S. Appl. No. 15/312,324, filed Nov. 18, 2016, 2017/0087750, Bernhard et al.

* cited by examiner

PRODUCTION OF HIGH TEMPERATURE POLYMER BASED PELLETS BY UNDERWATER PELLETIZATION AT ELEVATED WATER TEMPERATURE TO PRODUCE (RIGID) BEAD FOAMS

CROSS-REFERENCE TO RELATED APPLICATIONS

This application is the National Stage entry under § 371 of International Application No. PCT/EP2021/069689, filed on Jul. 15, 2021, and which claims the benefit of priority to European Application No. 20191446.2, filed on Aug. 18, 2020. The content of each of these applications is hereby incorporated by reference in its entirety.

BACKGROUND OF THE INVENTION

Field of the Invention

The present invention relates to a process for producing (rigid) particle foams from at least one polymer having a glass transition temperature according to ISO 11357-2 of at least 180° C. from polymer compositions using an underwater pelletization system.

Description of Related Art

Because of their high processing temperatures, industrial plastics can according to the prior art be processed only by strand pelletization. The cylindrical pellets thereby obtained have sharp edges. During transport and further processing, these sharp edges result in increased formation of dust and fine particles, which necessitate appropriate occupational safety measures. The quality of the pelletized material is also reduced, since damage to the pellet surfaces, for example microscopic cracks, can occur.

These problems are addressed to some degree by the underwater pelletization described in WO2005/056853. However, the pellets from this process have an increased proportion of surface defects (dents) and sometimes even defects in the pellet interior (vacuoles).

To remove low-grade pelletized material, laborious downstream sorting processes are necessary. EP3377288 and EP2361174 describe processes for producing a pelletized plastic material by underwater pelletization in a process chamber in which the process fluid has a temperature above 120° C., at a process pressure of at least 2.0 bar. The quality of the pelletized plastic materials is however insufficient for many uses.

There are in principle various approaches to the production of particle foams.

WO2019/038213 describes a process in which a composition consisting of 80% to 99.5% by weight of PEI, 0.5% to 10% by weight of blowing agent and 0% to 10% by weight of additives is processed into a foamed or foamable pelletized material by means of an extruder having a perforated plate. The temperatures between intake zone and screw tip are preferably within a range of between 320 and 400° C. In addition, there is usually no uniform temperature over this distance, but instead, for example, a gradient with rising temperature in the feed direction of the polymer melt. The temperature of the perforated plate is between 250 and 350° C. and the melt temperature on exit through the perforated plate is between 230 and 360° C. Loading with the blowing agent generally takes place in the extruder. The pelletized material then undergoes foaming on exiting the perforated plate, provided the pressure in the underwater pelletization is lower than the expansion force of the blowing agent. The expanded pelletized material then preferably undergoes subsequent further processing into a particle foam moulding. Since these foam beads usually have very low density, the cited process impacts negatively on economic transport in particular.

Moreover, expanded particle foams must during processing into mouldings always be compressed to avoid defects and cavities, which inevitably results in an increase in density and thus a reduction in lightweight construction potential.

WO 2019/025245 describes a process for producing expandable pellets that comprise blowing agent and are based on high-temperature thermoplastics. In this process, a polymer melt is produced by melting a polymer having a glass transition temperature of at least 180° C. and mixing with at least one nucleating agent in an extruder at temperatures between 300° C. and 350° C. After addition of the blowing agent to the polymer melt, the melt is cooled to temperatures between 180° C. and 250° C., conveyed through a perforated plate and pelletized in an underwater pelletizer with a water temperature between 75° C. and 99° C.

The requisite nozzle temperature is very high in relation to the usual water temperature, which is less than 100° C. This results in a cooling effect on the nozzle and thus in a risk of the polymer melt freezing in the nozzle, particularly on start-up of the process.

The article "Brillianten aus dem Reaktor" [Diamonds from the reactor] by Gloeckner und Müller, published in Kunststoffe. 2, 2016, describes a novel process intended to prevent polymer melts from freezing in the nozzle of the extruder. The article mentions various plastics. The production of particle foams, in particular from blowing agent-containing polymer melts. Is however not discussed.

SUMMARY OF THE INVENTION

Problem

The problem addressed by the present invention in respect of the prior art was that of providing a novel pelletization process for high-temperature particle foams.

Solution

The problem is solved by the provision of a process for producing (rigid) particle foams using an underwater pelletization system from a polymer composition comprising at least one polymer having a glass transition temperature according to ISO 11357-2 (published: 2014-07) of at least 180° C., characterized in that the polymer melt of the extruder
  a) is conveyed into a first water circuit that is pressurized, the pressure being within a range from 0.2 to 30 bar and the water temperature in the water circuit being within a range from 105° C. to 180° C.,
  b) is pelletized and
  c) is optionally supplied to a second water circuit that has a temperature below 100° C. and is operated
    1) unpressurized or
    2) under a pressure within a range from 0.2 to 30 bar.

In one embodiment of the invention, the polymer composition can on exiting the extruder be guided into an underwater pelletizer.

DETAILED DESCRIPTION OF THE INVENTION

Said underwater pelletizer is designed to operate at a combination of temperature and pressure such that there is a closed system present. According to the invention, the temperature in the first water circuit is 100° C. to 200° C. Through this approach, the large temperature difference between the polymer melt and the temperature of the process water in the underwater pelletizer is minimized. The risk of the polymer melt freezing in the nozzle described in the prior art can thus be averted.

In the conventional process, the polymer melt from the extruder is supplied to an underwater pelletization system operated at a water temperature below 100° C. This results in abrupt cooling of the pelletized material. The pellets accordingly develop dents on the surface of the pelletized material or vacuoles.

It has surprisingly been found that the procedure according to the invention has the result that the increased temperature level in the first water circuit makes it possible for the formation of dents or vacuoles to be prevented.

According to the invention, the first water circuit, which is pressurized, is operated at a pressure preferably within a range from 0.2 to 30 bar, preferably 5 to 30 bar, more preferably 3 to 10 bar. The water temperature in the first water circuit is preferably 105° C. to 180° C., more preferably 115° C. to 180° C.

The closed, pressurized water circulation system makes working at higher water temperatures possible while at the same time reducing the exposure or the operating personnel to hot steam.

Pelletization takes place in the first water circuit. This prevents the disadvantages of dust formation and the reduction in quality of the pelletized material due to scratching and sharp broken edges that are described in the prior art.

According to the invention, the pelletized material obtained can be supplied to a second water circuit having a temperature below 100° C. and operated unpressurized, alternatively at a pressure of 0.2 to 30 bar.

When the second water circuit according to process step c) 2) is operated under pressure, the pressure level is lowered to ambient pressure before separation of the pelletized material from the process water.

The pelletized material obtained may be supplied to a drying process.

Drying may be carried out using conventional dryers. Suitable for this purpose are for example centrifugal dryers, circulating-air dryers, compressed-air dryers, impact dryers, belt dryers, adsorption dryers, rotating drums with infrared heating or dryers containing molecular sieves.

In an alternative process variant, the pelletized material obtained is after process steps a) and b) immediately discharged from the pressurized first circuit and supplied to a drying process. This is of particular interest when the pelletized material obtained is to undergo further treatment at a higher temperature level.

In a further variant of the embodiment, a blowing agent-containing polymer composition can be processed by means of an extruder.

In this variant, the polymer composition is on exiting the extruder guided into the underwater pelletizer of the invention.

Said underwater pelletizer is designed to operate at a combination of temperature and pressure such that foaming is prevented from occurring, for example by the temperature in step a) being at least 5° C. below the Tg of the blowing agent-containing polymer melt. This approach affords a blowing agent-containing pelletized material that may subsequently be foamed to the desired density by a renewed input of energy and/or further processed into a particle foam workpiece by optional moulding.

The pressure present in the first water circuit, also referred to as the counterpressure, prevents the blowing agent from boiling, thereby preventing the pellets from foaming.

The blowing agents suitable for this process are selected from the group consisting of volatile organic compounds having a boiling point at standard pressure below the glass transition temperature of the base material, inorganic blowing agents, thermally decomposable blowing agents and mixtures of the above.

The volatile organic compound having a boiling point at standard pressure below the glass transition temperature of the base material and that is liquid at standard temperature (i.e. 25° C., 1013 mbar), is preferably selected from the group consisting of non-halogenated hydrocarbons, ketones, alcohols, halogenated hydrocarbons and mixtures of the above.

The ketone is preferably selected from acetone, methyl ethyl ketone, cyclohexanone, cyclononanone, diacetone alcohol and mixtures of the above. The ketone is more preferably selected from acetone, methyl ethyl ketone and mixtures of the above.

Suitable polymers having a glass transition temperature according to ISO 11357-2 of at least 180° C. are selected from the group of polysulfones or polyimides, in particular polyethersulfone (PESU), polyphenylsulfone (PPSU), polysulfone (PSU), polyetherimide (PEI), thermoplastic polyimides and mixtures thereof. Also suitable are particle foams based on a blend of PEI and polyether ether ketone (PEEK).

Stated glass transition temperatures are according to the invention measured by DSC (differential scanning calorimetry) unless otherwise specified. Those skilled in the art are aware that DSC is sufficiently informative only when, after a first heating cycle up to a temperature that is a minimum of 25° C. above the highest glass transition or melting temperature but at least 20° C. below the lowest decomposition temperature of a material, the material sample is held at this temperature for at least 2 min. The sample is then cooled back down to a temperature that is at least 20° C. below the lowest glass transition or melting temperature to be determined, wherein the cooling rate should be not more than 20° C./min, preferably not more than 10° C./min. After a further wait time of a few minutes, the actual measurement is then carried out, in which the sample is heated to at least 20° C. above the highest melting or glass transition temperature at a heating rate of generally 10° C./min or less.

In another variant of the process for producing a particle foam, a corresponding polymer composition comprising a nucleating agent is processed.

This optional nucleating agent is preferably selected from the group consisting of talc, graphite, carbon black, titanium dioxide and mixtures of the above. The optional nucleating agent advantageously improves the cell morphology.

The polymer composition contains 0.01% to 3% by weight, preferably 0.05% to 1% by weight, of nucleating agent based on the total mass.

The pellets produced according to the invention are processed further into (rigid) particle foams.

(Rigid) particle foams mean in this context foams, rigid foams, particle foams and rigid particle foams that are produced based on polymers having a glass transition temperature according to ISO 11357-2 of at least 180° C.

As a consequence of the better quality of the pellets, in particular the minimization of defects in the pelletized material or on the surface of the pellets, (rigid) particle foams having particularly uniform pore size distribution are obtained.

The (rigid) particle foams produced according to the process of the invention from at least one polymer having a glass transition temperature according to ISO 11357-2 of at least 180° C. find use in the construction of spacecraft or aircraft, in shipbuilding, rail vehicle construction or vehicle construction, particularly in electromobility, in the exterior thereof. These (rigid) particle foams can also be used to produce composite materials that can likewise find use in said applications.

(Rigid) particle foams from at least one polymer having a glass transition temperature according to ISO 11357-2 of at least 180° C. are in addition particularly suitable for incorporation in aircraft exteriors too. The "exterior" means not just as filling in the outer skin of an aircraft, but especially also in an aircraft nose, in the tall region. In the wings, in the outside doors, in the control surfaces or in rotor blades.

In particular, their low flammability means that the (rigid) particle foams and composite materials produced according to the invention can be installed in the interior of said vehicles too.

(Rigid) particle foams based on polymers having a glass transition temperature according to ISO 11357-2 of at least 180° C. are particularly suitable for incorporation in aircraft interiors. Besides jets or light aircraft, aircraft especially also includes helicopters or even spacecraft. Examples of installation in the interior of such an aircraft are, for example, the trays that can be folded down on the rear side of seats in passenger aircraft, filling for a seat or an internal partition, and also, for example, in internal doors.

The present process and the (rigid) particle foams generated therewith are particularly suitable for high-temperature uses.

EXAMPLES

Example 1

Underwater Pelletization of Ultem 1000 Type Polyetherimide.

Polyetherimide (PEI) (Ultem 1000, SABIC, the Netherlands), having a glass transition temperature of 217° C., measured according to ISO 11357-2 (published: 2014-07), is loaded into a reservoir vessel of an extruder (automatic single screw APM E1-180). The extrusion takes place at approx. 370-375° C. and a pressure of 15 bar. The throughput is 160 kg/h. The melt is supplied to an underwater pelletization system (Sphero 70, MAAG Automatlk GmbH, Germany) via a perforated plate. The pressure in the nozzle upstream of the perforated plate is approx. 195 bar. The pelletization is carried out with 9 knives at 2000 1/min.

The underwater pelletization takes place in two process water circuits. In a first, high-temperature circuit, the process water temperature is approx. 140° C. at a pressure of approx. 4.95 bar. In the second circuit, the process water temperature is approx. 70° C. at a pressure of approx. 2.5 bar. The residence time in the two circuits is in each case approx. 8 s.

The pelletized material is then dried in a centrifugal dryer (Centro 300, MAAG Automatik GmbH, Germany). The residual moisture content is 0.30% to 0.47%.

The invention claimed is:

1. A process for preparing expandable pellets with an underwater pelletization system from a polymer composition comprising at least one polymer having a glass transition temperature according to ISO 11357-2 published: 2014-07 of at least 180° C., the process comprising:
   a) conveying a polymer melt of the polymer composition from an extruder into a first water circuit that is pressurized, with a gauge pressure being within a range from 0.2 to 30 bar and a water temperature in the first water circuit being within a range from 105° C. to 180° C., and
   b) pelletizing,
   wherein the polymer composition comprises a blowing agent,
   further comprising:
   c) supplying a pelletized material from b) to a second water circuit that has a temperature below 100° C. and is operated
      1) unpressurized, or
      2) under a gauge pressure within a range from 0.2 to 30 bar.

2. The process for preparing expandable pellets according to claim 1, wherein the at least one polymer having a glass transition temperature according to ISO 11357-2 of at least 180° C. is selected from the group consisting of a polysulfone, a polyimide, and a mixture thereof.

3. The process for preparing expandable pellets according to claim 2, wherein the at least one polymer having a glass transition temperature according to ISO 11357-2 of at least 180° C. is selected from the group consisting of polyethersulfone (PESU), polyphenylsulfone (PPSU), polysulfone (PSU), polyetherimide (PEI), a thermoplastic polyimide, and a mixture thereof.

4. The process for preparing expandable pellets according to claim 1, wherein the temperature in a) is at least 5° C. below a Tg of the polymer melt containing the blowing agent and said at least one polymer.

5. The process for preparing expandable pellets according to claim 1, wherein the blowing agent is selected from the group consisting of a volatile organic compound having a boiling point at standard pressure below a glass transition temperature of said at least one polymer having a glass transition temperature according to ISO 11357-2 published: 2014-07 of at least 180° C., an inorganic blowing agent, a thermally decomposable blowing agent, and a mixture thereof.

6. The process for preparing expandable pellets according to claim 1, wherein the polymer composition comprises a nucleating agent.

7. The process for preparing expandable pellets according to claim 6, wherein the nucleating agent is selected from the group consisting of talc, graphite, carbon black, titanium dioxide, and a mixture thereof.

8. The process for preparing expandable pellets according to claim 1, wherein a pelletized material obtained after b) is discharged and supplied to a drying process.

9. The process for preparing expandable pellets according to claim 1, wherein a pelletized material obtained after c) is discharged and supplied to a drying process.

10. A method, comprising:
    installing foamed particles obtained by inputting energy into the expandable pellets produced by the process according to claim 1, in an aircraft, ship, or vehicle.

11. The method according to claim 10, wherein the vehicle is an electromobility vehicle.

* * * * *